(12) United States Patent
Hong et al.

(10) Patent No.: US 10,814,757 B2
(45) Date of Patent: Oct. 27, 2020

(54) SEATBACK FRAME FOR VEHICLES

(71) Applicants: HYUNDAI MOTOR COMPANY, Seoul (KR); KIA MOTORS CORPORATION, Seoul (KR); HYUNDAI TRANSYS INC., Seosan-si, Chungcheongnam-do (KR); DAYOU HOLDINGS CO., LTD., Gwangju (KR)

(72) Inventors: Suk Won Hong, Bucheon-si (KR); Gil Ju Kim, Seoul (KR); Jong Seok Han, Seoul (KR); Seon Chae Na, Yongin-si (KR); Chan Ho Jung, Gunpo-si (KR); Jin Sik Kim, Suwon-si (KR); Woo Suk Choi, Yongin-si (KR)

(73) Assignees: HYUNDAI MOTOR COMPANY, Seoul (KR); KIA MOTORS CORPORATION, Seoul (KR); HYUNDAI TRANSYS INC., Seosan-si, Chungcheongnam-Do (KR); DAYOU HOLDINGS CO., LTD., Gwangsan-Gu, Gwangju (KR)

( * ) Notice: Subject to any disclaimer, the term of this patent is extended or adjusted under 35 U.S.C. 154(b) by 0 days.

(21) Appl. No.: 16/393,000

(22) Filed: Apr. 24, 2019

(65) Prior Publication Data

US 2020/0171990 A1 Jun. 4, 2020

(30) Foreign Application Priority Data

Nov. 29, 2018 (KR) ........................ 10-2018-0150604

(51) Int. Cl.
*B60N 2/68* (2006.01)
*B60N 2/64* (2006.01)
*B60N 2/20* (2006.01)

(52) U.S. Cl.
CPC .............. *B60N 2/682* (2013.01); *B60N 2/20* (2013.01); *B60N 2/64* (2013.01)

(58) Field of Classification Search
CPC . B60N 2/682; B60N 2/20; B60N 2/68; B60N 2205/35; B60N 2/64
USPC ..................................................... 297/452.2
See application file for complete search history.

(56) References Cited

U.S. PATENT DOCUMENTS

| 5,676,423 | A | * | 10/1997 | Pedronno | ............... | B60N 2/686 |
| | | | | | | 297/378.1 |
| 5,685,612 | A | | 11/1997 | MacDonald et al. | | |
| 6,347,836 | B1 | * | 2/2002 | Hayotte | .................. | B60N 2/20 |
| | | | | | | 297/378.1 |
| 9,688,169 | B2 | * | 6/2017 | Contorbia | ................ | B60N 2/36 |

(Continued)

FOREIGN PATENT DOCUMENTS

KR 10-2005-0063686 A 6/2005
KR 10-0803041 2/2008

*Primary Examiner* — Milton Nelson, Jr.
(74) *Attorney, Agent, or Firm* — Brinks Gilson & Lione

(57) ABSTRACT

A seatback frame for vehicles is disclosed. The seatback frame for vehicles has a simple structure without bracket structures used to install a conventional seatback frame and thus achieves cost reduction and weight reduction. In particular, the seatback frame is segmented into several parts having different rigidities so that only a part, on which load is concentrated, is set to have high strength and thus avoids overdesign for excessively high strength of an unnecessary part.

9 Claims, 4 Drawing Sheets

(56) References Cited

U.S. PATENT DOCUMENTS

2013/0015693 A1* 1/2013 Tosco .................. B60N 2/2245
  297/452.2

* cited by examiner

SEATBACK FRAME FOR VEHICLES

CROSS-REFERENCE TO RELATED APPLICATION

This application claims priority to and the benefit of Korean Patent Application No. 10-2018-0150604, filed on Nov. 29, 2018, the entire contents of which are incorporated herein by reference.

FIELD

The present disclosure relates to a seatback frame for vehicles which includes a plurality of frames.

BACKGROUND

The statements in this section merely provide background information related to the present disclosure and may not constitute prior art.

Seats on which passengers sit are installed in a vehicle, and seats of a general vehicle include a front seat and a rear seat. Such seats include a back frame coupled to a seatback, and the back frame includes several kinds of brackets, wires and pipes. These parts are connected through welding and bolting.

Recently, various auxiliary devices are installed in seats. For example, a headrest to support a passenger's neck for convenience and safety of the passenger, a recliner to fold a seat, a latch and a striker to install a seat cushion, a retractor interlocked with a seat belt to fix the passenger to the seat in case of vehicle collision, a mounting device to install a safety seat for infants, etc. All the auxiliary devices are subject to strength regulations to ensure passenger safety and, for this reason, rigidity desired by a seat frame tends to be gradually increased.

In order to satisfy the strength regulations of the auxiliary devices having various functions, the thicknesses of pipes constituting a back frame should be increased and several kinds of brackets to connect the pipes should be welded, and thus the overall weight of the back frame is increased.

That is, a conventional back frame for vehicles includes pipes and several kinds of brackets and various auxiliary devices are installed. For desired rigidity, the thicknesses of the pipes are increased so as to raise rigidity. However, we have discovered that the conventional back frame has disadvantages, such as increase in the weight of the pipes and production costs, as well as costly overdesign for rigidity.

The above description has been provided to aid in understanding of the background of the present disclosure and should not be interpreted as conventional technology known to those skilled in the art.

SUMMARY

The present disclosure provides a seatback frame for vehicles which has a simple structure to achieve cost reduction and weight reduction, and is divided into parts having different rigidities. For example, a part, on which load is concentrated, is set to have higher strength than other parts.

In one form of the present disclosure, a seatback frame for vehicles may include: a frame unit including an upper part, a lower part and a side part, which are segmented from each other, the side part being coupled between the upper part and the lower part to form a back frame shape, and the lower part formed to have a hollow therein and provided with an open hole formed at each of ends thereof to communicate with the inside of the hollow, and hinge coupling units, each of which includes an insert end inserted into and coupled to the open hole of the lower part, and a mount end exposed from the lower part and mounted on a vehicle body to be rotatable.

An outer diameter of the insert end of the hinge coupling unit may be equal to or smaller than an inner diameter of the open hole of the lower part so that the insert end may be inserted into the open hole.

The side part may be coupled to the lower part at a joint region which is spaced apart from the ends of the lower part, and the insert end may extend beyond the joint region when the insert end is inserted into the open hole of the lower part.

In one form, an outer diameter of the mount end is greater than an outer diameter of the insert end and the outer diameter of the mount end is greater than or equal to an outer diameter of the lower part.

A plurality of through holes may be formed at the end of the lower part along the circumference thereof, and protrusions are formed at the insert end of the hinge coupling unit along a circumference thereof such that the protrusions are inserted into through holes of the plurality of through holes and exposed to outside through the through holes. In particular, the lower part and the hinge coupling unit may be coupled by welding the protrusions and the through holes.

The side part may include an outer pipe installed on the vehicle body and an inner pipe located relatively in the interior of a vehicle, and the upper part, the lower part, the outer pipes and the inner pipes of the side part may have different strengths.

The strength of the lower part and the outer pipes may be higher than the strength of the upper part and the inner pipes.

A thickness of the lower part and the outer pipes may be equal to or greater than a thickness of the upper part and the inner pipes.

The frame unit may further include a sub-part connected to the upper part and the lower part and arranged between the outer pipe and the inner pipe. In another form, the sub-part has a lowest strength among the sub-part, the upper part, the lower part and the side part.

The sub-part may have a thickness being equal to or smaller than the thicknesses of the lower part, the outer pipe and the inner pipe, and the sub-part has a strength lower than a strength of the lower part, the outer pipe and the inner pipe.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
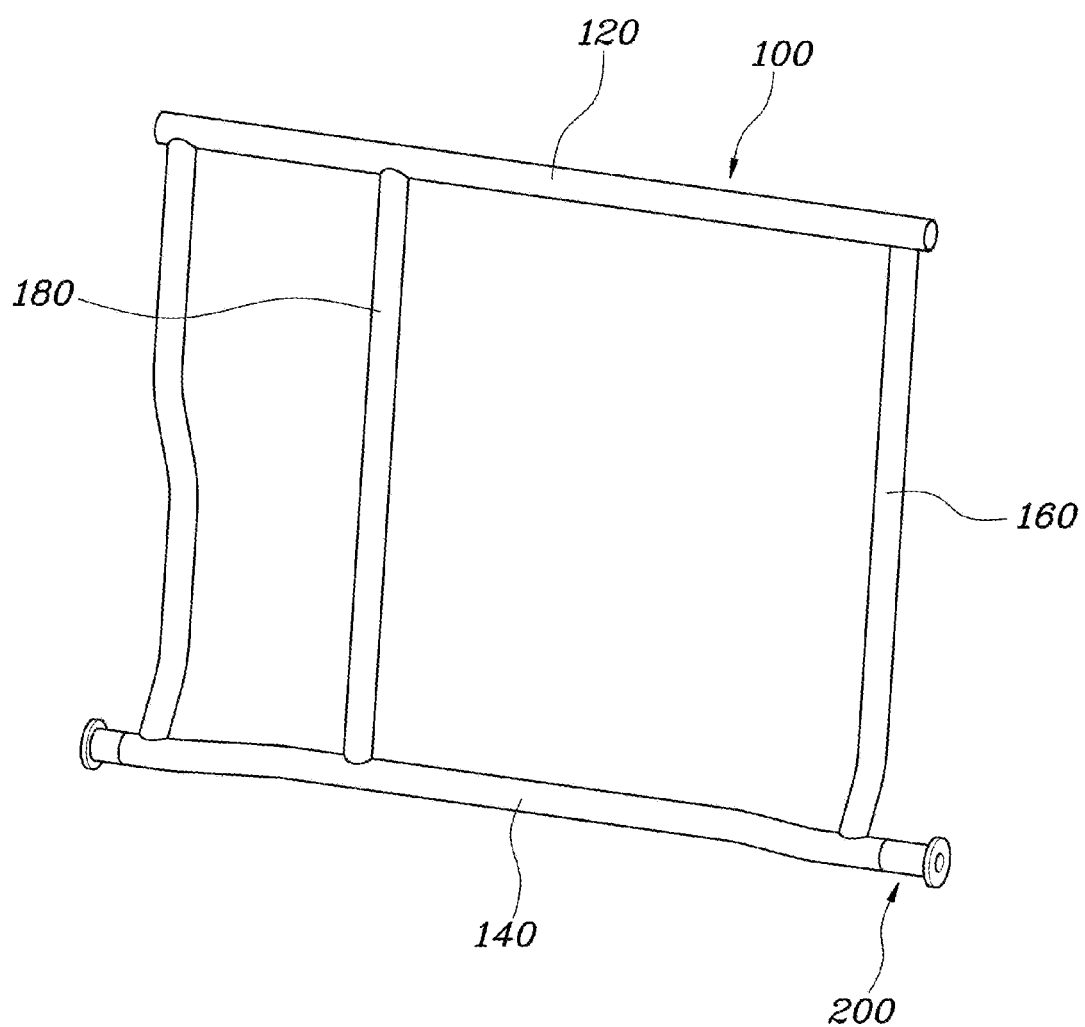
FIG. 1 is a perspective view of a seatback frame for vehicles in one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 is a perspective view of a seatback frame for vehicles in accordance with one form of the present disclosure, and FIGS. 2 to 5 are views illustrating the seatback frame for vehicles shown in FIG. 1.

A seatback frame for vehicles in one form of the present disclosure includes: a frame unit 100 segmented into an upper part 120, a lower part 140 and a side part 160, the side part 160 being coupled between the upper part 120 and the lower part 140 to form a back frame shape, and the lower part 140 formed to have a hollow therein and provided with an open hole 142 formed at each of ends thereof to communicate with the inside of the hollow, and hinge coupling units 200, each of which includes an insert end 220 inserted into and coupled to the open hole 142 of the lower part 140 and a mount end 240 exposed from the lower part 140 and mounted on a vehicle body to be rotatable.

As described above, the frame unit 100 in one form may include: the upper part 120, the lower part 140 and the side part 160 which are segmented from each other, all of the upper part 120, the lower part 140 and the side part 160 may be formed to have a hollow therein, and the back frame shape may be formed by coupling the respective parts 120, 140 and 160.

That is, since the frame unit 100 is not formed of one pipe and is segmented into the upper part 120, the lower part 140 and the side part 160, the upper part 120, the lower part 140 and the side part 160 are set to have different materials, thicknesses, etc. according to strengths desired by the respective parts 120, 140 and 160 and are then coupled, thus forming a seatback frame in which setting of the respective parts 120, 140 and 160 is optimized. That is, the strengths of the respective parts 120, 140 and 160 of the seatback frame may be determined according to results of a seat strength test. A conventional seatback frame is formed by bending one pipe for convenience regardless of strengths of respective parts and thus overdesign occurs, but, in the seatback frame in exemplary forms of the present disclosure, the frame unit 100 is segmented into a plurality of parts, the parts are coupled according to strengths desired by the respective parts and, thus, weight reduction and cost reduction due to optimized design may be achieved.

Particularly, the hinge coupling units 200, each of which includes the insert end 220 inserted into and coupled to the open hole 142 of the lower part 140 of the frame unit 100 and the mount end 240 exposed from the lower part 140 and mounted on the vehicle body to be rotatable, are provided.

The hinge coupling units 200 are provided to install the frame part 100 on the vehicle body to be rotatable. The insert end 220 is coupled to the lower part 140, and the mount end 240 serves as a hinge shaft so that the hinge coupling unit 200 is installed on the vehicle body to be rotatable. Here, a mount space to which the mount end 240 is connected to be rotatable may be provided in the vehicle body.

That is, the conventional seatback frame is formed of one pipe and thus essentially requires separate brackets provided with hinge shafts, in order to connect the seatback frame to a vehicle body to be rotatable. However, the brackets also perform the function of a reinforcing material of the seatback frame and thus cause increase in weight. In contrast, in the seatback frame in the exemplary form of the present disclosure, the conventional brackets are omitted, and the hinge coupling units 200 are inserted into the lower part 140 constituting the frame unit 100, and thus reinforce rigidity and simultaneously serve as hinges to install the frame unit 100 on a vehicle body to be rotatable.

Figure 2:
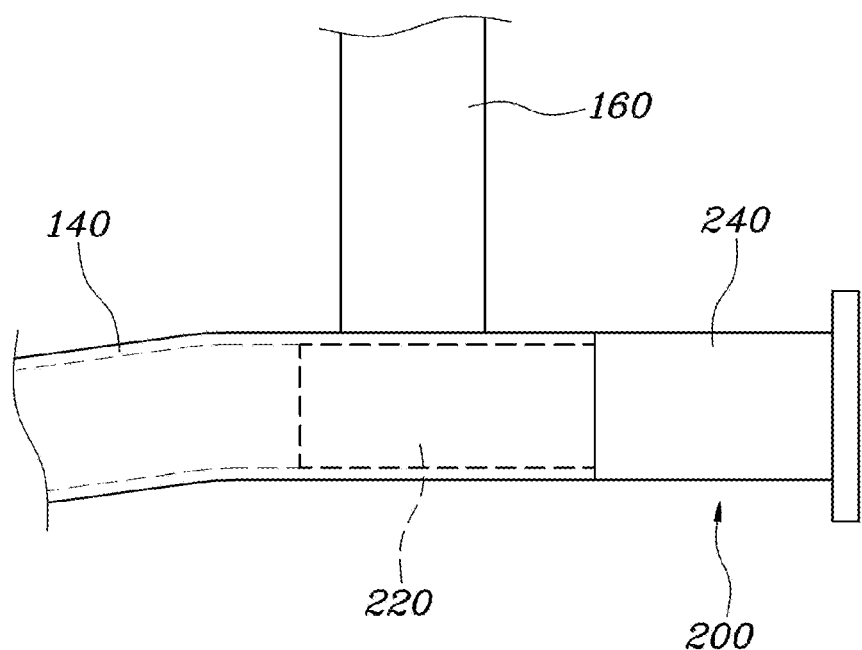
FIG. 2 is a view illustrating coupling of a hinge coupling unit and a lower part in the seatback frame for vehicles shown in FIG. 1.

In more detail, as exemplarily shown in FIG. 2, the outer diameter of the insert end 220 of the hinge coupling unit 220 is equal to or smaller than the inner diameter of the open hole 142 of the lower part 140 so that the insert end 220 may be inserted into the open hole 142.

As such, by setting the outer diameter of the insert end 220 of the hinge coupling unit 200 to be equal to or smaller than the inner diameter of the open hole 142 of the lower part 140, the insert end 220 may be coupled to the open hole 142 through insertion. Therefore, the hinge coupling unit 200 may be fixed to the lower part 140 through the insert end 220, rigidity of a region of the lower part 140 into which the insert end 220 is inserted is reinforced, and thus the lower part 140 secures durability and strength. Further, the outer surface of the insert end 220 and the inner surface of the lower part 140 are pressed against each other and thus coupled to each other integrally and, thus, endurance strength against deformation is secured.

Further, the side part 160 is coupled to a joint region of the lower part 140 which is spaced apart from the end of the lower part 140. Therefore, as exemplarily shown in FIG. 2, the end of the lower part 140 extends farther sideward than the side part 160 and, thus, the side part 160 may be firmly supported by the lower part 140.

In addition, when the insert end 220 of the hinge coupling unit 200 is inserted into the open hole 142 of the lower part 140, the insert end 220 may extend beyond a joint region at which the side part 160 is coupled to the lower part 140.

That is, the greatest load is applied to the joint region of the lower part 140, to which the side part 160 is coupled, in a strength test. Accordingly, by extending the insert end 220 of the hinge coupling unit 200 through the open hole 142 of the lower part 140 so as to go beyond the joint region below the side part 160, rigidity of the coupling region between the lower part 140 and the side part 160 is locally strengthened. Further, by extending the insert end 220 so as to pass through the side part 160, rigidity around the joint region of the lower part 140 to which the side part 160 is coupled is strengthened and, thus, the corresponding region locally secures endurance strength against deformation.

The hinge coupling unit 200 may be formed such that the outer diameter of the mount end 240 is greater than the outer diameter of the insert end 220 and the outer diameter of the mount end 240 is greater than or equal to the outer diameter of the lower part 140.

Thereby, when the insert end 220 of the hinge coupling unit 200 is inserted into the open hole 142 of the lower part 140, the mount end 240 is caught by the end of the lower part 140 and thus an insertion length of the lower part 140 is determined. Therefore, the insert end 220 of the hinge coupling unit 200 may be arranged inside the lower part 140 below the side part 160, and the mount end 240 may come into contact with the end of the lower part 140, thus maintaining a firm connection state between the hinge coupling unit 200 and the lower part 140.

Figure 3:
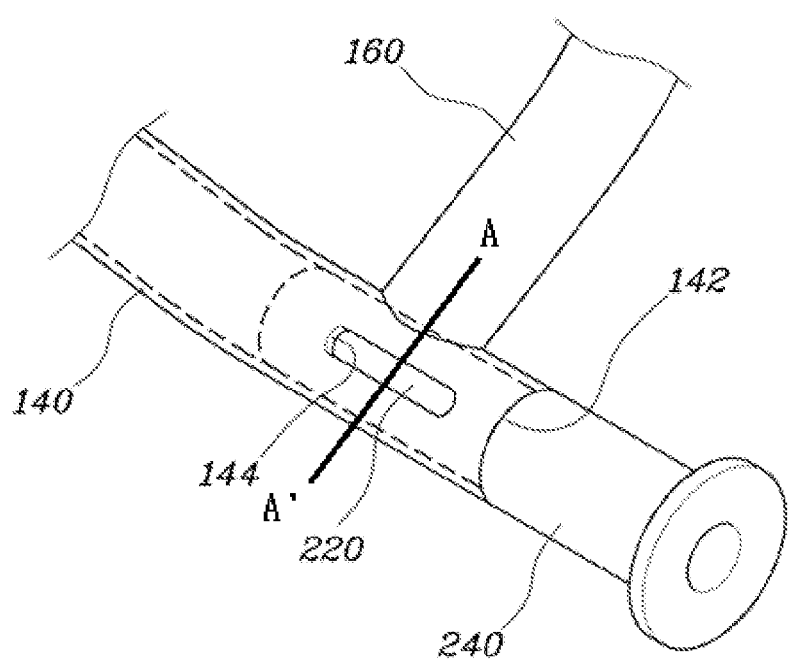
FIG. 3 is a view illustrating a coupling structure in which protrusions of the hinge coupling unit are inserted into through holes of the lower part in the seatback frame for vehicles shown in FIG. 1.
Figure 4:
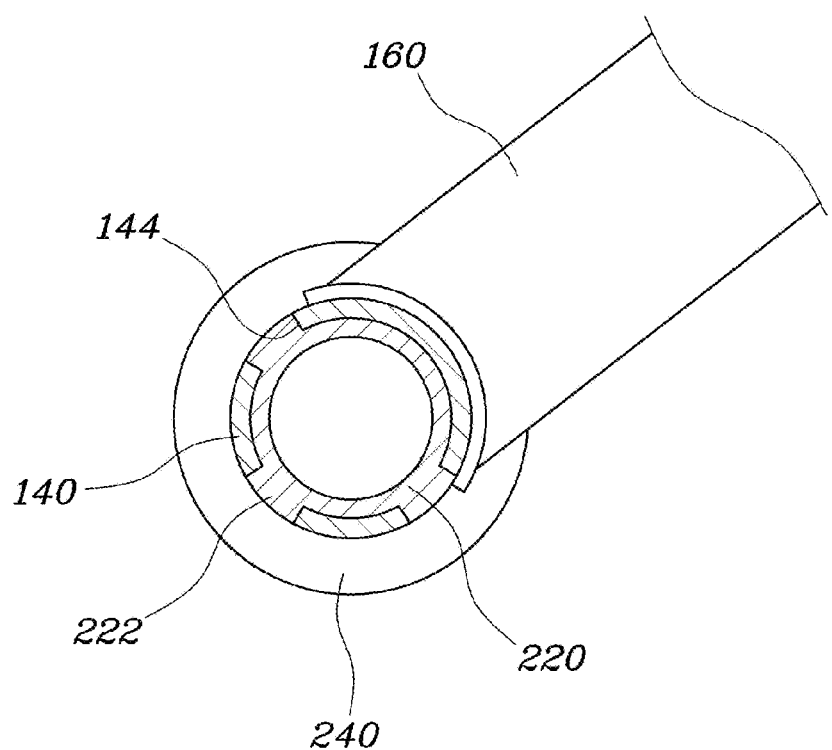
FIG. 4 is a cross-sectional view taken along a line A-A' with respect to a coupling portion of the hinge coupling unit and the lower part shown in FIG. 3.

As exemplarily shown in FIGS. 3 and 4, a plurality of through holes 144 is formed at the end of the lower part 140 along the circumference thereof, protrusions 222 inserted into the through holes 144 and exposed to the outside through the through holes 144 are formed at the insert end 220 of the hinge coupling unit 200 along the circumference thereof, and the lower part 140 and the hinge coupling unit 200 may be coupled by welding the protrusions 222 and the through holes 144 under the condition that the protrusions 222 are exposed through the through holes 144.

Therefore, when the insert end of the hinge coupling unit 200 is inserted into the open hole 142 of the lower part 140, the protrusions 222 formed at the insert end 220 are exposed through the through holes 144 formed on the lower part 140 and, thus, the insert end 220 and the lower part 140 are mutually locked and connected. In such a state, when the protrusions 222 and the through holes 144 are coupled by welding, the insert end 220 of the hinge coupling unit 200 and the lower part 140 are integrally coupled and, thus, coupling rigidity is enhanced.

The through holes 144 of the lower part 140 and the protrusions 222 of the hinge coupling unit 200 may be provided in plural along the circumferences of the lower part 140 and the hinge coupling unit 200, and the through holes 144 and the protrusions 222 may be located at the region of the lower part 140, to which the side part 160 is coupled, along the circumferential surfaces of the lower part 140 and the hinge coupling unit 200 so as to avoid the side part 160.

Figure 5:
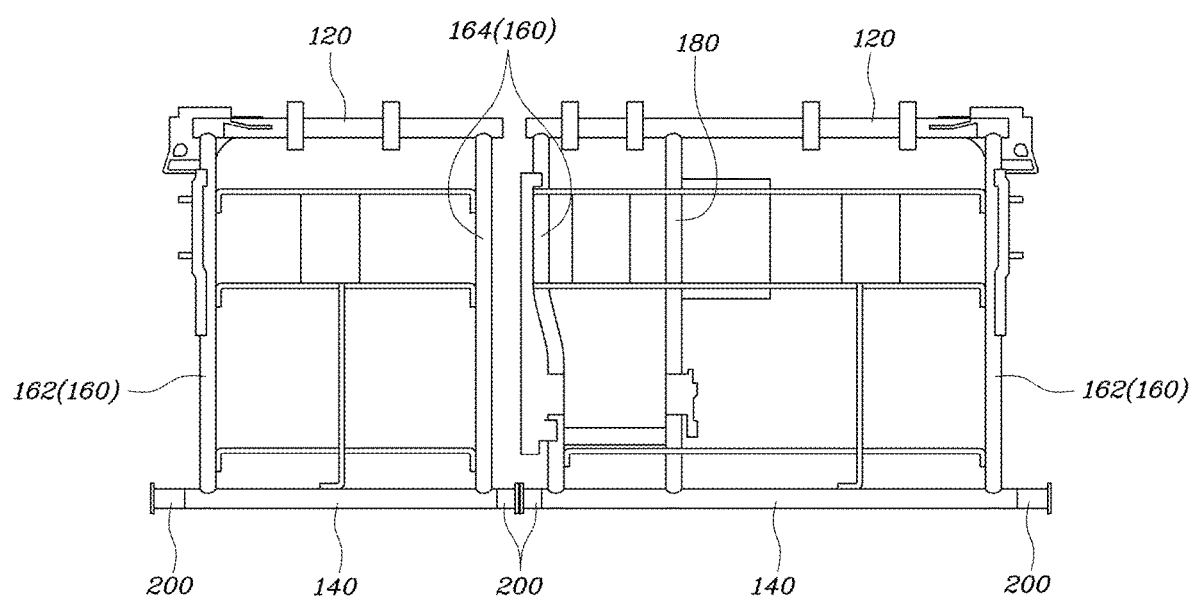
FIG. 5 is a perspective view illustrating an arrangement of a sub-part of a seatback frame for a vehicle in another form of the present disclosure.

Further, as exemplarily shown in FIGS. 1 and 5, the side part 160 may include outer pipes 162 installed on the vehicle body, and inner pipes 164 located relatively in the interior of the vehicle. The outer pipes 162 and the inner pipe 164 which are spaced apart from each other are coupled between the upper part 120 and the lower part 140 in a vertical direction, thus forming the back frame shape.

Particularly, the upper part 120, the lower part 140, the outer pipes 162 and the inner pipes 164 of the side part 160 constituting the frame unit 100 in accordance with the present disclosure may have different strengths. That is, materials, diameters, thicknesses, etc. of the upper part 120, the lower part 140, the outer pipes 162 and the inner pipes 164 may be different according to strengths required by the respective parts 120, 140, 162 and 164 after a strength test by vehicle collision, thus providing an improved frame unit 100.

In more detail, the frame unit 100 may be configured such that the strength of the lower part 140 and the outer pipes 162 is higher than the strength of the upper part 120 and the inner pipes 164.

Further, the thickness of the lower part 140 and the outer pipes 162 may be equal to or greater than the thickness of the upper part 120 and the inner pipes 164.

That is, since the lower part 140 and the outer pipes 162 support other parts and are connected to the vehicle body, the greatest load is applied to the lower part 140 and the outer pipes 162 in the strength test. Therefore, the lower part 140 and the outer pipes 162 should have higher strength than the strength of the upper part 120 and the inner pipes 164 and a greater thickness than the thickness of the upper part 120 and the inner pipes 164.

Further, since a headrest pole guide is installed at the upper part 120, a percentage of the upper part 120 in a package is high, and big load is not relatively applied to the upper part 120 in the strength test.

In addition, since the inner pipes 164 correspond to regions for armrests or appearance finishing, a percentage of the inner pipes 164 in the package is high, but greater load is locally applied to the inner pipes 164 than the upper part 120 in the strength test.

Therefore, the upper part 120 and the inner pipes 164 may have lower strength and thickness than those of the lower part 140 and the outer pipes 162, and the inner pipes 164 may have higher strength than that of the upper part 120.

Accordingly, the lower part 140, the outer pipes 162, the inner pipes 164 and the upper part 120 of the frame unit 100 may be arranged in order from the highest strength to the lowest strength, and the upper part 120 does not require high strength and thus has a relatively small thickness as compared to other parts, so as to reduce weight.

Further, as exemplarily shown in FIG. 5, the frame unit 100 may further include a sub-part 180 connected to the upper part 120 and the lower part 140 and arranged between the outer pipe 162 and the inner pipe 164. Seat components except for a seat belt may be mounted on the sub-part 180, and no great load is applied to the sub-part 180 in the strength test. Therefore, among the sub-part 180, the upper part 120, the lower part 140 and the side part 160, the sub-part 180 may have the lowest strength. In addition, the sub-part 180 has a thickness which is equal to or smaller than the thicknesses of the lower part 140, the outer pipes 162 and the inner pipes 164 and a strength which is lower than the strengths thereof, and may thus stably support the upper part 120 and the lower part 140 together with the side part 160 and reduce weight due to thickness reduction.

As described above, since the frame unit 100 in one form of the present disclosure is formed to have different strengths of the upper part 120, the lower part 140, the outer pipes 162, the inner pipes 164 and the sub-part 180 according to strengths required when load is applied thereto, improved design of the frame unit 100 is possible. Further, since the respective parts 120, 140, 162, 164 and 180 of the frame unit 100 may be set to have different thicknesses according to the required strengths thereof, the weight of the frame unit 100 may be reduced.

Accordingly, the materials, strengths and thicknesses of the upper part 120, the lower part 140, the outer pipes 162, the inner pipes 164 and the sub-part 180 may be set as follows. Some of these materials, strengths and thicknesses of the upper part 120, the lower part 140, the outer pipes 162, the inner pipes 164 and the sub-part 180 may be changed according to designs.

The upper part 120 and the inner pipes 164 may be formed of STKM13A, the sub-part 180 may be formed of STKM11A, and the lower part 140 and the outer pipes 162 may be formed of SPFC780DP.

Further, the upper part 120 and the inner pipes 164 may have strength of 330 kgf/mm$^2$, the sub-part 180 may have strength of 250 kgf/mm$^2$, and the lower part 140 and the outer pipes 162 may have strength of 780 kgf/mm$^2$.

In addition, the upper part 120 may have a thickness of 1.6 t, and the inner pipes 164, the lower part 140, the outer pipes 162 and the sub-part 180 may have a thickness of 2.0 t.

Accordingly, the materials, strengths and thicknesses of the respective parts and pipes 120, 140, 162, 164 and 180 of the above-described frame unit 100 are determined, thus providing an improved frame unit.

As is apparent from the above description, a seatback frame for vehicles in the exemplary forms of the present disclosure has a simple structure without bracket structures used to install a conventional seatback frame and thus achieves cost reduction and weight reduction, and is segmented into parts having different rigidities so that only a part, on which load is concentrated, is set to have high strength and thus prevents overdesign caused by excessively high strength of an unnecessary part.

Although the exemplary forms of the present disclosure have been disclosed for illustrative purposes, those skilled in the art will appreciate that various modifications, additions and substitutions are possible, without departing from the scope and spirit of the present disclosure.

What is claimed is:

1. A seatback frame for vehicles, comprising:
a frame unit comprising an upper part, a lower part and a side part, which are segmented from each other, the side part being coupled between the upper part and the lower part to form a back frame shape, and the lower part formed to have a hollow therein and provided with an open hole formed at each of ends thereof to communicate with an inside of the hollow; and
hinge coupling units, each of which comprises: an insert end inserted into and coupled to the open hole of the lower part, and a mount end exposed from the lower part and mounted on a vehicle body to be rotatable,
wherein:
the side part is coupled to the lower part at a joint region which is spaced apart from the ends of the lower part; and
the insert end extends beyond the joint region when the insert end is inserted into the open hole of the lower part.

2. The seatback frame for vehicles according to claim 1, wherein an outer diameter of the insert end of the hinge coupling unit is smaller than an inner diameter of the open hole of the lower part so that the insert end is inserted into the open hole.

3. The seatback frame for vehicles according to claim 1, wherein a plurality of through holes is formed at the end of the lower part along a circumference thereof, and protrusions are formed at the insert end of the hinge coupling unit along a circumference thereof such that the protrusions are inserted into through holes of the plurality of through holes and exposed to outside through the through holes, and
wherein the lower part and the hinge coupling unit are coupled by welding the protrusions and the through holes.

4. The seatback frame for vehicles according to claim 1, wherein an outer diameter of the mount end is greater than an outer diameter of the insert end, and the outer diameter of the mount end is greater than or equal to an outer diameter of the lower part.

5. The seatback frame for vehicles according to claim 1, wherein:
the side part comprises an outer pipe installed on the vehicle body, and an inner pipe located relatively in an interior of a vehicle; and
the upper part, the lower part, the outer pipe and the inner pipe of the side part have different strengths.

6. The seatback frame for vehicles according to claim 5, wherein the strength of the lower part and the outer pipe is higher than the strength of the upper part and the inner pipe.

7. The seatback frame for vehicles according to claim 6, wherein a thickness of the lower part and the outer pipe is equal to or greater than a thickness of the upper part and the inner pipe.

8. The seatback frame for vehicles according to claim 5, wherein the frame unit further comprises a sub-part connected to the upper part and the lower part and arranged between the outer pipe and the inner pipe,
wherein the sub-part has a lowest strength among the sub-part, the upper part, the lower part and the side part.

9. The seatback frame for vehicles according to claim 8, wherein the sub-part has a thickness being equal to or smaller than thicknesses of the lower part, the outer pipe and the inner pipe, and the sub-part has a strength lower than a strength of the lower part, the outer pipe and the inner pipe.

* * * * *